United States Patent [19]

Weaver et al.

[11] 3,951,942

[45] Apr. 20, 1976

[54] PHENYL-AZO-TETRAHYDROQUINOLINE AZO COMPOUNDS

[75] Inventors: Max A. Weaver; James M. Straley; Clarence A. Coates, Jr., all of Kingsport, Tenn.

[73] Assignee: The University of Delaware, Newark, Del.

[22] Filed: Feb. 21, 1974

[21] Appl. No.: 444,619

Related U.S. Application Data

[63] Continuation-in-part of Ser. No. 216,239, Jan. 7, 1972, abandoned.

[52] U.S. Cl.............................. 260/155; 260/283 R; 260/287 R; 260/289 R
[51] Int. Cl.² .................... C09B 29/36; D06P 1/08; D06P 3/24
[58] Field of Search .................................. 260/155

[56] References Cited
UNITED STATES PATENTS

| | | | |
|---|---|---|---|
| 2,529,924 | 11/1950 | Dickey | 260/155 |
| 2,746,952 | 5/1956 | Dickey et al. | 260/155 |
| 2,830,042 | 4/1958 | Dittmar et al. | 260/146 T |
| 2,839,523 | 6/1958 | Towne et al. | 260/155 |
| 2,883,374 | 4/1959 | Enders | 260/146 T |
| 2,888,450 | 5/1959 | Kruckenberg | 260/155 |
| 3,386,990 | 6/1968 | Dale et al. | 260/155 |

Primary Examiner—Floyd D. Higel

[57] ABSTRACT

Azo compounds especially useful for dyeing polyamide fibers on which the compounds exhibit improved fastness and dyeability properties contain a phenyl diazo component having a substituent in the 4-position and hydrogen, chlorine or bromine in the 2-position, and a tetramethyl substituted tetrahydroquinoline coupling component.

10 Claims, No Drawings

PHENYL-AZO-TETRAHYDROQUINOLINE AZO COMPOUNDS

This is a continuation-in-part application of our copending application Ser. No. 216,239 filed Jan. 7, 1972, now abandoned.

This invention concerns certain novel azo compounds especially useful for dyeing polyamide fibers, yarns and fabrics. These azo compounds have the general formula

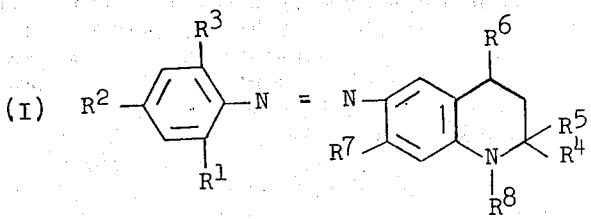

wherein
$R^1$ is hydrogen, halogen or cyano;
$R^2$ is lower alkylsulfonyl; lower alkylsulfonyl substituted with cyano, hydroxy, cyclohexyl or aryl; lower alkoxycarbonyl; lower alkoxycarbonyl substituted with lower alkoxy, lower alkanoyloxy, cyano, halogen or aryl; cyano; —$SO_2NR^9R^{10}$; —$CONR^9R^{10}$; or arylazo;
$R^3$ is hydrogen or halogen;
$R^4$ is methyl or, when $R^5$ and $R^6$ each is hydrogen, $R^4$ can be lower alkyl;
$R^5$ and $R^6$ each is hydrogen or methyl;
$R^7$ is hydrogen or lower alkyl; and
$R^8$ is alkyl containing one to about eight carbon atoms or lower alkyl substituted with hydroxy, —$CONR^9R^{10}$ or

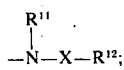

in which $R^9$ individually is hydrogen, lower alkyl, cyclohexyl or aryl; $R^{10}$ individually is hydrogen or lower alkyl; $R^9$ and $R^{10}$ in combination are pentamethylene or ethyleneoxyethylene; $R^{11}$ is hydrogen, lower alkyl or lower hydroxyalkyl; $R^{12}$ is aryl, cyclohexyl, furyl, lower alkyl or lower alkyl substituted with hydroxy, lower alkoxy, cyano, halogen, aryl or aryloxy; X is —CO—, —COO— or —$SO_2$—; and each aryl moiety is phenyl or phenyl substituted with lower alkyl, lower alkoxy or halogen.

Our novel azo compounds exhibit good dyeability, as exemplified by superior exhaustion, good color fastness to perspiration (acid), superior dry heat fastness, migration, fastness to light, and resistance to sublimation when applied to polyamide fibers by conventionaal disperse dyeing techniques. Another advantage inherent in our novel compounds is their relatively low cost. This excellent combination of properties renders the novel compounds superior to known phenyl-azo-tetrahydroquinoline compounds such as those disclosed in U.S. Pat. Nos. 2,251,947; 2,261,176; 2,322,925; 2,323,315; 2,342,678; 2,351,886; 2,442,345; 2,338,871 and 3,386,990. Our azo compounds are especially valuable for dyeing carpets of polyamide fibers where fastness to light and migration are particularly important.

The substituents represented by $R^1$ through $R^8$ are well known in the art and/or can be derived from commercially-available or readily-obtainable chemicals by means of published procedures. As used herein to describe an alkyl moiety, "lower" designates a carbon content of one to about four carbon atoms, e.g., methyl, ethyl, propylene, isopropyl, butyl and isobutyl. Chlorine and bromine are typical of the halogen atoms which can be present on our novel azo compounds. The alkylsulfonyl and alkoxycarbonyl groups which $R^2$ can represent preferably are unsubstituted. Preferred groups represented by $R^8$ are lower alkyl or the group having the formula —$(CH_2)_n$—Y in which n is two or three and Y is hydroxy, —$CONR^9R^{10}$ or —NH—X—$R^{12}$ in which $R^9$ and $R^{10}$ each is hydrogen or lower alkyl or, in combination, $R^9$ and $R^{10}$ are pentamethylene or ethyleneoxyethylene, X is —CO— or —COO— and $R^{12}$ is phenyl, cyclohexyl, lower alkyl or lower alkyl substituted with hydroxy, lower alkoxy, cyano, chlorine, bromine, phenyl or phenoxy.

A group of our novel compounds which, because of their relative economy and excellent properties, are especially valuable for dyeing polyamide fibers having the formula

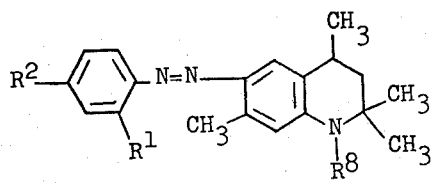

wherein
$R^1$ is hydrogen, chlorine or bromine;
$R^2$ is lower alkylsulfonyl, lower alkoxycarbonyl, cyano, —$SO_2NR^9R^{10}$, or —$CONR^9R^{10}$; and
$R^8$ is lower alkyl, —$CH_2CH_2CONR^9R^{10}$, or —$(CH_2)_n$—NH—X—$R^{12}$; in which $R^9$ and $R^{10}$ each is hydrogen or lower alkyl or, in combination, $R^9$ and $R^{10}$ are pentamethylene or ethyleneoxyethylene, n is two or three, X is —CO— or —COO—, and $R^{12}$ is lower alkyl.

The novel compounds of the invention are prepared by diazotizing an appropriately substituted aniline compound and coupling the resulting diazonium salt with a coupler having the formula (II) 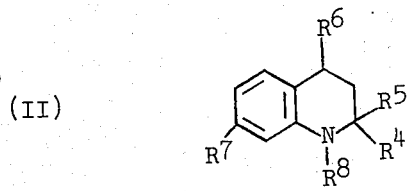

according to conventional procedures. The aniline compounds are known and/or can be obtained according to published techniques. The couplers (II) also can be synthesized by means well known in the art. For example, an N-cyanoalkyl-1,2,3,4,-tetrahydroquinoline can be hydrolyzed to form the corresponding N-carbamoylakyl compound or it can be catalytically hydrogenated to the corresponding aminoalkyl compound which then can be treated with a variety of acylating agents to yield the N-acylamidoalkyl-1,2,3,4-tetrahydroquinoline coupler. Additional procedures are disclosed in U.S. Pat. Nos. 3,247,211 and 3,254,073.

Our novel azo compounds and their synthesis are further illustrated by the following examples.

EXAMPLES 1–10

To 50 ml. of concentrated $H_2SO_4$ is added 7.2 g. $NaNO_2$ portionwise with stirring. The solution is cooled and 100 ml. of 1:5 acid (1 part propionic acid; 5 parts acetic acid) is added below 20°C. The mixture is cooled and 2-bromo-4-cyanoaniline (19.7 g.) is added, followed by 100 ml. 1:5 acid, all below 5°C. The reaction is stirred at 0–5°C. for 2 hr. Each of the following couplers (.01 mole) is dissolved in a 40 ml. portion of 1:5 acid.

N-(2-Carbamoylethyl)-2,2,4,7-tetramethyl-1,2,3,4-tetrahydroquinoline (Example 1).

N-(2-Acetamidoethyl)-2,2,4,7-tetramethyl-1,2,3,4-tetrahydroquinoline (Example 2).

N-(3-Acetamidopropyl)-2,2,4,7-tetramethyl-1,2,3,4-tetrahydroquinoline (Example 3).

N-(3-Ethoxy carbonyl aminopropyl)-2,2,4,7-tetramethyl-1,2,3,4-tetrahydroquinoline (Example 4).

N-(2-Hydroxyethyl)-2,2,4,7-tetramethyl-1,2,3,4-tetrahydroquinoline (Example 5).

N-(2-Propionamidoethyl)-2,2,4,7-tetramethyl-1,2,3,4-tetrahydroquinoline (Example 6).

N-(2-Carbamoylethyl)-2,7-dimethyl-1,2,3,4-tetrahydroquinoline (Example 7).

N-(2-Acetamidoethyl)-2,7-dimethyl-1,2,3,4-tetrahydroquinoline (Example 8).

N-(2-Carbamoylethyl)-2-isopropyl-7-methyl-1,2,3,4,-tetrahydroquinoline (Example 9).

N-(2-Carbamoylethyl)-2,24-trimethyl-1,2,3,4-tetrahydroquinoline (Example 10).

To each chilled coupler solution is a .01 mole aliquot of diazonium solution. The coupling mixtures are buffered by the addition of ammonium acetate and allowed to stand for 1 hr. The azo products are precipitated by the addition of water, collected by filtration, washed with water, and dried in air. If necessary, the azo products can be purified by slurrying in hot methanol, cooling, filtering, and washing with methanol. Each of the azo compounds obtained produces bright, level red shades on polyamide fibers and exhibits good fastness to light.

The azo compounds set forth in the examples of the following Table conform to Formula (I) and are prepared according to the procedures described hereinabove. Examples 1–10 of the Table designate the structures of the azo compounds prepared in Examples 1–10 above. The color given for each compound refers to the shade it produces on polyamide fibers.

| Example No. | $R^1$ | $R^2$ | $R^3$ | $R^4,R^5,R^6,R^7$ | $R^8$ | Color |
|---|---|---|---|---|---|---|
| 1 | —Br | —CN | H | 2,2,4,7-tetra-$CH_3$ | —$CH_2CH_2CONH_2$ | Red |
| 2 | —Br | —CN | H | 2,2,4,7-tetra-$CH_3$ | —$CH_2CH_2NHCOCH_3$ | Red |
| 3 | —Br | —CN | H | 2,2,4,7-tetra-$CH_3$ | —$(CH_2)_3NHCOCH_{ncocns}$ | Red |
| 4 | —Br | —CN | H | 2,2,4,7-tetra-$CH_3$ | —$(CH_2)_3NHCOOC_2H_5$ | Red |
| 5 | —Br | —CN | H | 2,2,4,7-tetra-$CH_3$ | —$CH_2CH_2OH$ | Red |
| 6 | —Br | —CN | H | 2,2,4,7-tetra-$CH_3$ | —$CH_2CH_2NHCOC_2H_5$ | Red |
| 7 | —Br | —CN | H | 2,7-di-$CH_3$ | —$CH_2CH_2CONH_2$ | Red |
| 8 | —Br | —CN | H | 2,7-di-$CH_3$ | —$CH_2CH_2NHCOCH_3$ | Red |
| 9 | —Br | —CN | H | 2-$CH(CH_3)_2$—7-$CH_3$ | —$CH_2CH_2CONH_2$ | Red |
| 10 | —Br | —CN | H | 2,2,4-tri-$CH_3$ | —$CH_2CH_2CONH_2$ | Red |
| 11 | Cl | —$SO_2CH_3$ | H | 2,2,4,7-tetra-$CH_3$ | —$CH_2CH_2OH$ | Red |
| 12 | Cl | —$SO_2(CH_2)_3CH_3$ | H | 2,2,4,7-tetra-$CH_3$ | —$CH_2CH_2OH$ | Red |
| 13 | Cl | —$SO_2CH_2CH_2CN$ | H | 2,2,4,7-tetra-$CH_3$ | —$CH_2CH_2OH$ | Red |
| 14 | Cl | —$SO_2CH_3C_6H_{11}$ | H | 2,2,4,7-tetra-$CH_3$ | —$CH_2CH_2OH$ | Red |
| 15 | Cl | —$SO_2CH_2CH_2C_6H_5$ | H | 2,2,4,7-tetra-$CH_3$ | —$CH_2CH_2OH$ | Red |
| 16 | Br | —$SO_2CH_3$ | H | 2,2,4,7-tetra-$CH_3$ | —$CH_2CH_2OH$ | Red |
| 17 | Br | —$SO_2CH_3$ | H | 2,2,4,7-tetra-$CH_3$ | —$CH_2CH_2CONH_2$ | Red |
| 18 | Cl | —$SO_2CH_3$ | H | 2,2,4,7-tetra-$CH_3$ | —$CH_2CH_2CONH_2$ | Red |
| 19 | Cl | —$SO_2CH_3$ | H | 2,2,4,7-tetra-$CH_3$ | —$CH_2CH_2NHCOCH_3$ | Red |
| 20 | Cl | —$SO_2CH_3$ | H | 2,2,4,7-tetra-$CH_3$ | —$(CH_2)_3NHCOCH_3$ | Red |
| 21 | Cl | —$SO_2CH_3$ | H | 2,7-di-$CH_3$ | —$CH_2CH_2NHCOC_2H_5$ | Red |
| 22 | Cl | —$SO_2CH_3$ | H | 2,2,4,7-tetra-$CH_3$ | —$CH_2CH(CH_3)_2$ | Red |
| 23 | Cl | —$SO_2CH_3$ | H | 2,2,4,7-tetra-$CH_3$ | —$CH_2CH(C_2H_5)(CH_2)_3CH_3$ | Red |
| 24 | Cl | —$SO_2CH_3$ | H | 2,2,4,7-tetra-$CH_3$ | —$(CH_2)_3NHCOCH_2OH$ | Red |
| 25 | Cl | —$SO_2CH_3$ | H | 2,2,4,7-tetra-$CH_3$ | —$CH_2CH_2NHCOOC_2H_5$ | Red |
| 26 | Cl | —$SO_2CH_3$ | H | 2,2,4,7-tetra-$CH_3$ | —$(CH_2)_3NHSO_2CH_3$ | Red |
| 27 | Cl | —$SO_2CH_3$ | H | 2,2,4,7-tetra-$CH_3$ | —$CH_2CH_2NHCOC_6H_{11}$ | Red |
| 28 | Cl | —$SO_2CH_3$ | H | 2,2,4,7-tetra-$CH_3$ | —$CH_2CH_2NHCOC_6H_5$ | Red |
| 29 | Cl | —$SO_2CH_3$ | H | 2,2,4,7-tetra-$CH_3$ | —$CH_2CH_2NHCOCH_2Cl$ | Red |
| 30 | Cl | —$SO_2CH_3$ | H | 2,2,4,7-tetra-$CH_3$ | —$CH_2CH_2NHCOCH_2CH_2OCH_3$ | Red |
| 31 | Cl | —$SO_2CH_3$ | H | 2,2,4,7-tetra-$CH_3$ | —$CH_2CH_2CONHC_2H_5$ | Red |
| 32 | Cl | —$SO_2CH_3$ | H | 2,2,4,7-tetra-$CH_3$ | —$CH_2CH_2CONHCH(CH_3)_2$ | Red |
| 33 | Cl | —$SO_2CH_3$ | —Cl | 2,2,4,7-tetra-$CH_3$ | —$CH_2CH_2OH$ | Reddish-brown |
| 34 | —CN | —$SO_2CH_3$ | H | 2,2,4,7-tetra-$CH_3$ | —$(CH_2)_3NHCOCH_3$ | Violet |
| 35 | —CN | —CN | H | 2,2,4,7-tetra-$CH_3$ | —$(CH_2)_3NHCOCH_3$ | Violet |
| 36 | —CN | —$COOC_2H_5$ | H | 2,2,4,7-tetra-$CH_3$ | —$(CH_2)_3NHCOCH_3$ | Violet |
| 37 | —CN | —$SO_2NHC_2H_5$ | H | 2,2,4,7-tetra-$CH_3$ | —$(CH_2)_3NHCOCH_3$ | Violet |
| 38 | H | —CN | H | 2,2,4,7-tetra-$CH_3$ | —$(CH_2)_3NHCOCH_3$ | Orange |
| 39 | H | —$SO_2CH_3$ | H | 2,2,4,7-tetra-$CH_3$ | —$(CH_2)_3NHCOCH_3$ | Orange |
| 40 | —Cl | —CN | H | 2,2,4,7-tetra-$CH_3$ | —$(CH_2)_3NHCOCH_3$ | Red |
| 41 | —Br | —$COOC_2H_5$ | H | 2,2,4,7-tetra-$CH_3$ | —$(CH_2)_3NHCOCH_3$ | Red |
| 42 | —Br | —$COOC_2H_5$ | H | 2,2,4,7-tetra-$CH_3$ | —$CH_2CH_2CONH_2$ | Red |
| 43 | —Br | —$COOC_2H_5$ | H | 2,2,4,7-tetra-$CH_3$ | —$CH_2CH_2NHCOCH_3$ | Red |
| 44 | —Br | —CN | H | 2,2,4,7-tetra-$CH_3$ | —$CH_2CH_2N(CH_2H_2OH)SO_2CH_3$ | Red |
| 45 | —Br | —$CONH_2$ | H | 2,2,4,7-tetra-$CH_3$ | —$CH_2CH_2CONH_2$ | Scarlet |
| 46 | —Br | —$CONH_2$ | H | 2,2,4,7-tetra-$CH_3$ | —$CH_2CH_2OH$ | Scarlet |
| 47 | —Br | —$CONH_2$ | H | 2,2,4,7-tetra-$CH_3$ | —$CH_2CH_2NHCOCH_3$ | Scarlet |
| 48 | —Br | —$CONH_2$ | H | 2,2,4,7-tetra-$CH_3$ | —$C_2H_5$ | Scarlet |
| 49 | —Br | —$CONHC_2H_5$ | H | 2,2,4,7-tetra-$CH_3$ | —$CH_2CH_2CONH_2$ | Scarlet |
| 50 | —Br | —$CON(C_2H_5)_2$ | H | 2,2,4,7-tetra-$CH_3$ | —$CH_2CH_2CONH_2$ | Scarlet |
| 51 | —Br | —$CONHC_6H_5$ | H | 2,2,4,7-tetra-$CH_3$ | —$CH_2CH_2CONH_2$ | Scarlet |
| 52 | —Br | —$CONHC_6H_{11}$ | H | 2,2,4,7-tetra-$CH_3$ | —$CH_2CH_2CONH_2$ | Scarlet |
| 53 | —CN | —$CONH_2$ | H | 2,2,4,7-tetra-$CH_3$ | —$CH_2CH_2CONH_2$ | Red |
| 54 | —Br | —$SO_2CH_3$ | H | 2,2,4,7-tetra-$CH_3$ | —$CH_2CH(OH)CH_3$ | Red |

-continued

| Example No. | R¹ | R² | R³ | R⁴,R⁵,R⁶,R⁷ | R⁸ | Color |
|---|---|---|---|---|---|---|
| 55 | —Br | —SO₂NHC₂H₅ | H | 2,2,4,7-tetra-CH₃ | —CH₂CH₂CONH₂ | Scarlet |
| 56 | —Br | —SO₂NCH₂CH₂OCH₂CH₂ | H | 2,2,4,7-tetra-CH₃ | —CH₂CH₂CONH₂ | Scarlet |
| 57 | —Br | —SO₂CH₃ | H | 2,2,4-tri-CH₃ | —CH₂CH₂CONH₂ | Red |
| 58 | —Br | —CN | H | 2-CH(CH₃)₂-7-CH₃ | —CH₂CH₂OH | Red |
| 59 | —Br | —SO₂CH₂CH₂OH | H | 2,2,4,7-tetra-CH₃ | —CH₂CH₂OH | Red |
| 60 | —Br | —SO₂CH₂CN | H | 2,2,4,7-tetra-CH₃ | —CH₂CH₂OH | Red |
| 61 | —Br | —COOCH₃ | H | 2,2,4,7-tetra-CH₃ | —CH₂CH₂OH | Scarlet |
| 62 | —Cl | —CONH₂ | —Cl | 2,2,4,7-tetra-CH₃ | —CH₂CH₂NHCOCH₃ | Reddish-brown |
| 63 | —Cl | —SO₂CH₃ | —Br | 2,2,4,7-tetra-CH₃ | —CH₂CH₂NHCOCH₃ | Reddish-brown |
| 64 | —Cl | —SO₂CH₃ | H | 2,2,4,7-tetra-CH₃ | —CH₂CH₂NHCOCH₂CH₂Cl | Red |
| 65 | —Cl | —SO₂CH₃ | H | 2,2,4,7-tetra-CH₃ | —CH₂CH₂NHCOCH₂OC₆H₅ | Red |
| 66 | —Cl | —SO₂CH₃ | H | 2,2,4,7-tetra-CH₃ | —CH₂CH₂NHCO(CH₂)₃OH | Red |
| 67 | —Cl | —SO₂CH₃ | H | 2,2,4,7-tetra-CH₃ | —CH₂CH₂CONHCH₂CH₂CH₂CH₂ | Red |
| 68 | H | C₃H₅N=N— | H | 2,2,4,7-tetra-CH₃ | —CH₂CH₂NHCOCH₃ | Red |
| 69 | H | p-CH₃O—C₃H₄N=N— | H | 2,2,4,7-tetra-CH₃ | —CH₂CH₂CONH₂ | Red |
| 70 | H | o-Cl-p-CH₃—C₆H₅N=N— | H | 2,2,4,7-tetra-CH₃ | —CH₂CH₂NHCOOC₂H₅ | Red |

The novel azo compounds can be applied to polyamide textile materials, including yarns, fabrics and carpets, according to known disperse dyeing techniques. Various dispersing and wetting agents can be employed in the dispersion of the finely divided dye compound in an essentially aqueous dyebath. Procedures by which the compounds of the invention can be applied to polyamide textile materials are described in U.S. Pat. Nos. 3,100,134 and 3,320,021. The following example illustrates a method for applying the novel compounds to polyamide fibers.

EXAMPLE 71

The azo compound (16.7 mg.) of Example 1 is dispersed in 10 cc. of 2-methoxyethanol. A small amount (3–5 cc.) of a 3% sodium lignin sulfonate solution is added, with stirring, and then the volume of the bath is brought to 150 cc. with water. A 5 g. textile fabric made of nylon 66 fibers is placed in the bath and worked 10 minutes without heat. The bath is then slowly brought to the boil over a 30-minute period and the dyeing is carried out at the boil for one hour. The dyed fabric is then removed from the dyebath, rinsed with water and dried in an oven at 250°F. The fabric is dyed a bright shade of red exhibiting excellent fastness properties when tested in accordance with the procedures described in the Technical Manual of the American Association of Textile Chemists and Colorists, 1968 edition.

The polyamide materials which can be dyed with the novel azo compounds are well known and include nylon 66 (polyhexamethylene adipamide) manufactured by the polymerization of adipic acid and hexamethylenediamine, nylon 6 (polycaprolactum) prepared from epsilon-aminocaproic acid lactum (caprolactum) and nylon 8. A detailed description of the synthetic polyamide materials which are dyed bright, fast shades by the compounds of the invention is set forth in U.S. Pat. No. 3,100,134. Although our novel compounds are particularly suited for dyeing polyamide fibers, they also can be used to dye other synthetic textile materials such as cellulose acetate and polyamide fibers.

The invention has been described in detail with particular reference to preferred embodiments thereof, but it will be understood that variations and modifications can be effected within the spirit and scope of the invention.

We claim:

1. A compound having the formula

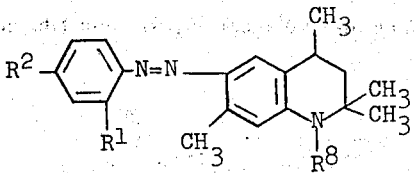

wherein
R¹ is hydrogen, chlorine, or bromine;
R² is lower alkylsulfonyl, lower alkoxycarbonyl, cyano, —SO₂NR⁹R¹⁰, or —CONR⁹R¹⁰;
R⁸ is lower alkyl or the group —(CH₂)ₙ—Y in which n is two or three and Y is hydroxy, —CONR⁹R¹⁰ or —NH—X—R¹²; in which R⁹ and R¹⁰ individually are hydrogen or lower alkyl, R⁹ and R¹⁰ in combination are pentamethylene or ethyleneoxyethylene, X is —CO— or —COO—, and R¹² is phenyl, cyclohexyl, lower alkyl or lower alkyl substituted with hydroxy, lower alkoxy, cyano, chlorine, bromine, phenyl or phenoxy.

2. A compound according to claim 1 having the formula

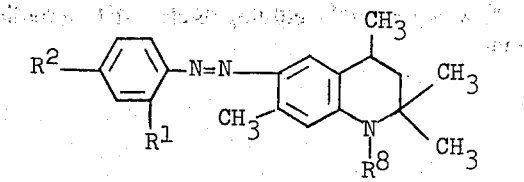

wherein
R¹ is hydrogen, chlorine or bromine;
R² is lower alkylsulfonyl, lower alkoxycarbonyl, cyano, —SO₂NR⁹R¹⁰, or —CONR⁹R¹⁰; and
R⁸ is lower alkyl, —CH₂CH₂CONR⁹R¹⁰, or —(CH₂)ₙ—NH—X—R¹²; in which R⁹ and R¹⁰ individually are hydrogen or lower alkyl, R⁹ and R¹⁰ in combination are pentamethylene or ethyleneoxyethylene, n is two or three, X is —CO— or —COO—, and R¹² is lower alkyl.

3. A compound according to claim 1 having the formula

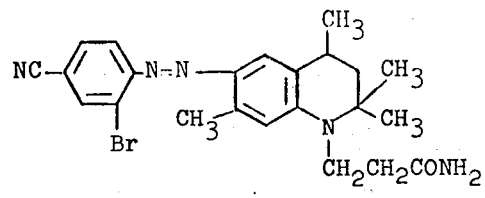
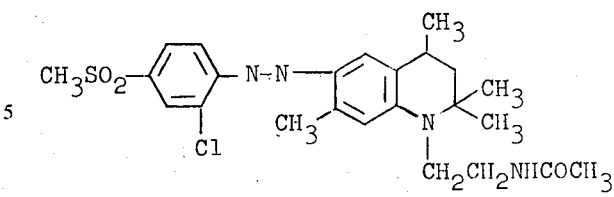
4. A compound according to claim 1 having the formula
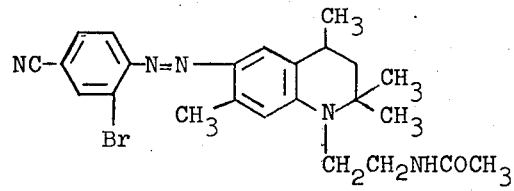
5. A compound according to claim 1 having the formula
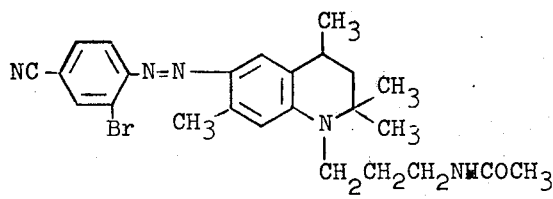
6. A compound according to claim 1 having the formula
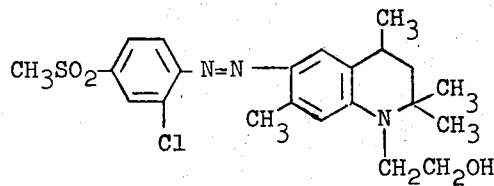
7. A compound according to claim 1 having the formula
8. A compound according to claim 1 having the formula
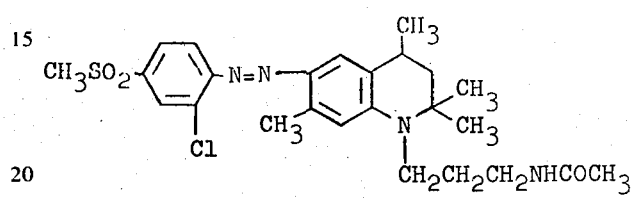
9. A compound according to claim 1 having the formula
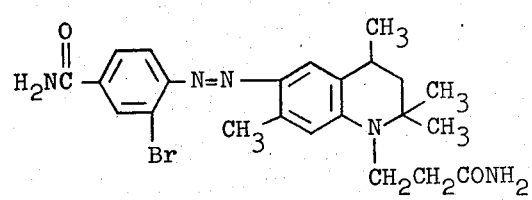
10. A compound according to claim 1 having the formula
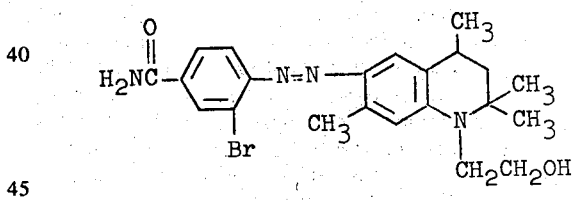
* * * * *

UNITED STATES PATENT OFFICE
CERTIFICATE OF CORRECTION

Patent No. 3,951,942                     Dated April 20, 1976

Inventor(s) Max A. Weaver, et al.

It is certified that error appears in the above-identified patent and that said Letters Patent are hereby corrected as shown below:

In the Heading at [73] the Assignee should read

---Assignee:  Eastman Kodak Company---
                        Rochester, New York Signed and Sealed this Sixth Day of June 1978

[SEAL]

Attest:

RUTH C. MASON
*Attesting Officer*

DONALD W. BANNER
*Commissioner of Patents and Trademarks*